Nov. 18, 1924.                                      1,516,482
G. H. GRAY
AUTOMOBILE OPERATING LEVER LOCK
Filed April 1, 1922
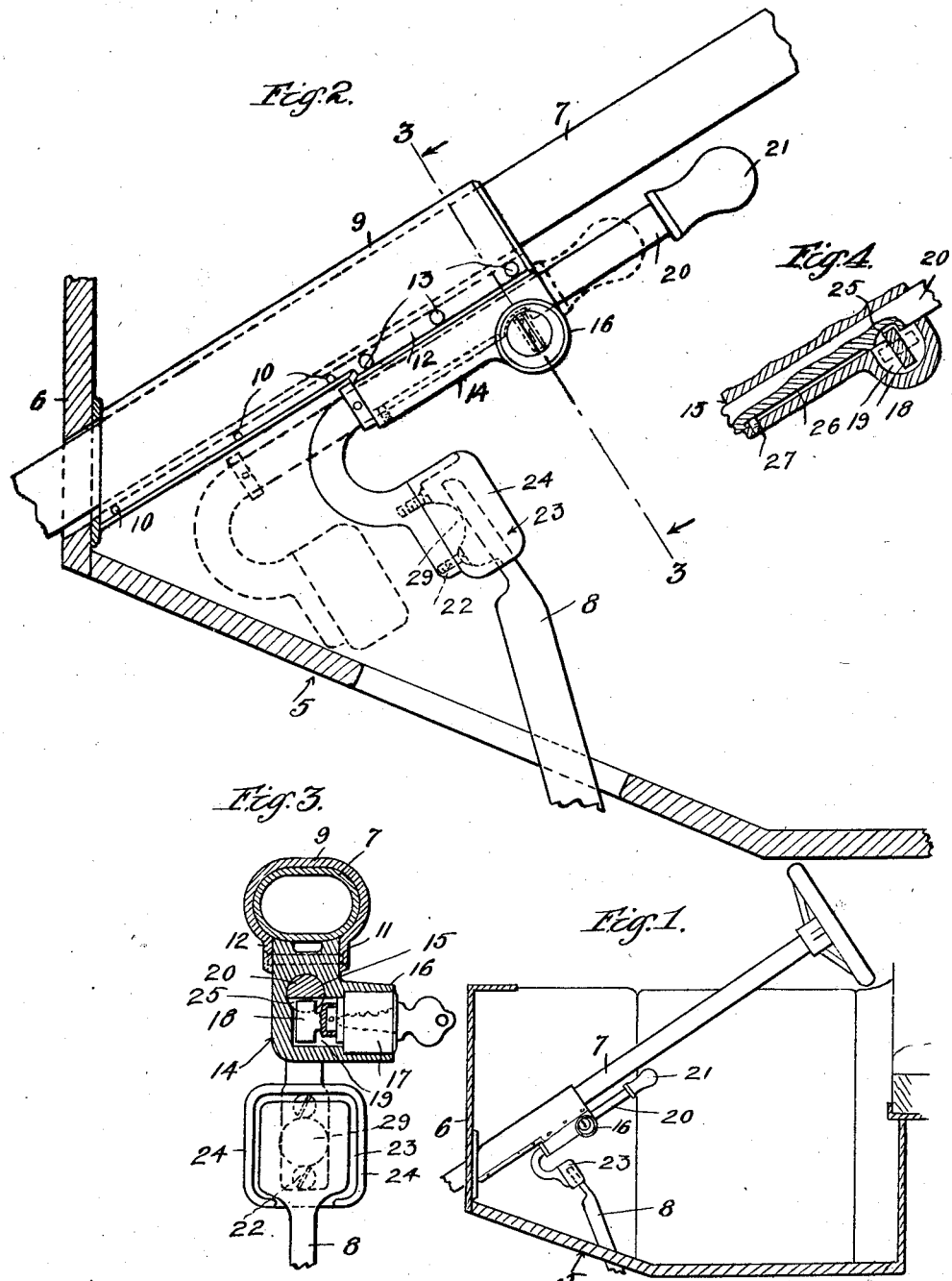
Inventor
by Granville H. Gray Patented Nov. 18, 1924.

1,516,482

UNITED STATES PATENT OFFICE.

GRANVILLE H. GRAY, OF SANTA ANA, CALIFORNIA.

AUTOMOBILE OPERATING LEVER LOCK.

Application filed April 1, 1922. Serial No. 548,714.

*To all whom it may concern:*

Be it known that I, GRANVILLE H. GRAY, a citizen of the United States, residing at Santa Ana, in the county of Orange, State of California, have invented new and useful Improvements in Automobile Operating Lever Locks, of which the following is a specification.

This invention relates to a locking mechanism adapted to be utilized in locking against operative movement operating levers, such as clutch and brake pedals of automobiles.

An object of the invention is to provide a simple and inexpensive locking mechanism that may readily be applied to various makes of automobiles to lock the clutch and other operating pedals in an inoperative position, in order to prevent an unauthorized use.

Another object of this invention is to provide a locking mechanism for automobiles that while rendering them inoperative under their own power will not prevent a manual movement of the same if for any untoward cause it should become necessary.

Other objects and advantages will at once become apparent from the following description, reference being had to the drawings accompanying the same and forming a part thereof, in which:

Fig. 1 is a partial longitudinal section through the forward end of an automobile body, showing the locking mechanism engaging an operating pedal and locking the same against movement.

Fig. 2 is an enlarged side elevation of the locking mechanism in a locked position, the dotted lines indicating the unlocked position.

Fig. 3 is a transverse section through the locking mechanism, taken on the line 3—3 of Fig. 2.

Fig. 4 is a fragmental longitudinal section through the lock showing the locking members of the mechanism, said members being in a locked position.

The locking mechanism herein described can be readily applied to all makes of motor vehicles with little or no radical changes in construction, the mechanism in this instance being shown as applied to a "Ford" motor car. In the drawings 5 designates the forward end of a vehicle body, 6 the transverse front end partition, 7 the steering column, 8 the gear operating pedal, all of usual construction.

The locking mechanism preferably consists of a tubular sleeve 9 rigidly secured around the lower end of the steering column 7, by means of rivets 10 or other securing means.

The upper end of sleeve 9 is spread apart to form two oppositely disposed attaching flanges 11 and 12, these flanges extending from the extreme upper end downward approximately half the length of member 9. Rigidly attached to flanges 11, 12, by means of rivets 13, is a member 14 provided with a centrally disposed longitudinal bore 15 extending therethrough. At the upper end of member 14 is formed a lock casing 16 in which is mounted a key operated cylinder lock 17 of usual form. The end of lock 17 is provided with a locking bolt 18 that is disposed in a recess 19 formed in member 14, the recess opening into the longitudinal bore 15, as clearly shown in Figs. 3 and 4 of the drawings. Slidingly mounted in bore 15 is a pedal engaging operating rod or arm 20 provided on its upper end with a handle 21, the lower end being of semi-circular form to strengthen the same. The extreme portion of the lower end of rod 20 is formed into a flat plate to which is secured by means of screws or rivets 22 the pedal engaging plate 23, provided on its upper edges with a flange 24 extending around three of its sides, (clearly shown in Fig. 3 of the drawings) designed to prevent any lateral movement of the rod or arm from the pedal when in a locked relation.

Operating rod 20 is provided in its surface with a bolt engaging notch 25 of quadrant form and is also provided with a key way 26, a pin 27 secured in the lower end of member 14 projecting into said key way and guiding the rod when the same is pushed upwardly or downwardly, as clearly shown in Fig. 1 of the drawings.

In Fig. 2 of the drawings I have shown the mechanism in full lines in a locked position, the flanged plate 23 engaging the upper end 28 of the gear operating pedal 8, while its inoperative position is shown in dotted lines, permitting the free and unrestricted operation of pedal 8 when desired.

Plate 23 is provided on its pedal contacting surface with a lug 29 for the purpose of accommodating the plate to various forms of gear or clutch pedals.

It will be observed that the lower end of sleeve 9 contacts with the transverse partition or end 6 of the vehicle body, thus preventing any manipulation of said sleeve for the purpose of disengaging the sliding rod or arm from the operating pedal.

From the foregoing description it is thought that the operation of the lock will be readily understood. Briefly stated, however, it is as follows: The lock is shown and described as being attached to a "Ford" car, but as stated heretofore it may be readily attached to other types of cars provided with gear changing mechanisms. As illustrated in Figs. 1 and 2, the locking mechanism is shown in a locked position, the lower plate 23 of the sliding rod or arm 20 engaging the upper end of the transmission controlling lever or pedal 8, which in its normal position holds the gears in "high speed". The locking bolt 18 being in engagement with the quadrant notch 25 formed in the sliding rod or arm 20, prevents a disengagement of the plate 23 from the gear operating pedal.

To disengage the arm 20 from pedal 8, the key is inserted in the lock 17 and the bolt 18 is thrown out of engagement with the notch 25 formed in the sliding arm or rod 20, which is then pushed downwardly to the postion shown in dotted lines in Fig. 2, thus permitting a free operation of the gear pedal. In cars provided with a clutch operating pedal the clutch members are normally in engagement, so it will be apparent that when the device is in locked engagement with the clutch operating pedal it will be impossible to start the car.

While I have illustrated the locking mechanism in connection with a steering wheel column, it will be understood that it may be applied to any other stationary object or part of a vehicle, the steering column in most instances being the most convenient point of placement.

What I claim is:

1. In combination with an operating pedal of an auto vehicle, of a stationary member mounted adjacent said pedal, a pedal engaging member slidingly mounted on said stationary member adapted to detachably engage the operating pedal to prevent a movement thereof, and means mounted on said stationary member for locking said sliding member in its pedal engaged position.

2. In combination with the steering column and the clutch operating pedal of an auto vehicle, of a stationary member rigidly secured to the steering column having a bore therethrough, a clutch pedal engaging member slidingly mounted in the bore of said stationary member, said pedal engaging member adapted to detachably engage the clutch operating pedal to prevent a movement thereof, and means mounted on said stationary member for locking said pedal member in its pedal engaged position.

In witness that I claim the foregoing I have hereunto subscribed my name this 20th day of March, 1922.

GRANVILLE H. GRAY.